(12) United States Patent
Soria (10) Patent No.: US 10,507,931 B2
(45) Date of Patent: Dec. 17, 2019

(54) PANEL AND INSERT FOR CORNER RADII (71) Applicant: Rohr, Inc., Chula Vista, CA (US)

(72) Inventor: Christian Soria, La Mesa, CA (US)

(73) Assignee: Rohr, Inc., Chula Vista, CA (US)

(*) Notice: Subject to any disclaimer, the term of this patent is extended or adjusted under 35 U.S.C. 154(b) by 355 days.

(21) Appl. No.: 15/297,840

(22) Filed: Oct. 19, 2016

(65) Prior Publication Data

US 2017/0297729 A1    Oct. 19, 2017

Related U.S. Application Data (60) Provisional application No. 62/243,493, filed on Oct. 19, 2015.

(51) Int. Cl.
*B64D 29/00* (2006.01)
*B32B 7/12* (2006.01)
(Continued)

(52) U.S. Cl.
CPC ............. *B64D 29/00* (2013.01); *B29C 70/30* (2013.01); *B29C 70/68* (2013.01); *B32B 1/00* (2013.01); *B32B 3/08* (2013.01); *B32B 3/12* (2013.01); *B32B 3/18* (2013.01); *B32B 5/26* (2013.01); *B32B 7/12* (2013.01); *B32B 15/043* (2013.01); *B32B 15/08* (2013.01); *B32B 15/12* (2013.01); *B32B 27/08* (2013.01); *B32B 27/10* (2013.01); *B32B 27/12* (2013.01); *B32B 29/02* (2013.01); *B32B 37/06* (2013.01); *B32B 37/10* (2013.01); *B32B 37/12* (2013.01); *B32B 37/14* (2013.01); *B32B 37/144* (2013.01); *B32B 37/18* (2013.01); *B32B 2250/40* (2013.01); *B32B 2260/021* (2013.01); *B32B 2260/046* (2013.01); *B32B 2307/10* (2013.01); *B32B 2307/102* (2013.01); *B32B 2307/54* (2013.01);
(Continued)

(58) Field of Classification Search
None
See application file for complete search history.

(56) References Cited

U.S. PATENT DOCUMENTS 5,101,621 A    4/1992   Mutch
8,474,573 B2   7/2013   Pacary et al.
(Continued)

FOREIGN PATENT DOCUMENTS

EP   2781728 A2 *  9/2014   ............... F02K 1/56

OTHER PUBLICATIONS

Adhesives and Sealants: Basic Concepts and High Tech Bonding, Handbook of Adhesives and Sealants, vol. 1 (ed. Philippe Cognard), John Bishopp, "Aerospace: A Pioneer in Structural Adhesive Bonding," pp. 241, 245 (2005). (Year: 2005).*
(Continued)

*Primary Examiner* — Catherine S Branch
(74) *Attorney, Agent, or Firm* — O'Shea Getz P.C.

(57) ABSTRACT

Aspects of the disclosure are directed to a panel configured for use on an aircraft nacelle, comprising: a first skin, a second skin, a first core portion coupled to the first skin and the second skin, a second core portion coupled to the first skin and the second skin, and an insert coupled to the first skin, the second skin, the first core portion, and the second core portion, the insert forming a corner fitting between the first core portion and the second core portion.

8 Claims, 7 Drawing Sheets (51) Int. Cl.
*B32B 37/06* (2006.01)
*B32B 3/12* (2006.01)
*B32B 37/10* (2006.01)
*B32B 37/12* (2006.01)
*B32B 37/14* (2006.01)
*B29C 70/68* (2006.01)
*B32B 37/18* (2006.01)
*B29C 70/30* (2006.01)
*B32B 5/26* (2006.01)
*B32B 15/04* (2006.01)
*B32B 15/08* (2006.01)
*B32B 15/12* (2006.01)
*B32B 27/08* (2006.01)
*B32B 27/10* (2006.01)
*B32B 27/12* (2006.01)
*B32B 29/02* (2006.01)
*B32B 1/00* (2006.01)
*B32B 3/08* (2006.01)
*B32B 3/18* (2006.01)

(52) U.S. Cl.
CPC ... *B32B 2307/546* (2013.01); *B32B 2307/732* (2013.01); *B32B 2605/18* (2013.01)

(56) References Cited

U.S. PATENT DOCUMENTS

| | | |
|---|---|---|
| 8,834,667 B2 | 9/2014 | McCarville et al. |
| 2008/0179448 A1* | 7/2008 | Layland ............... B64D 15/12 244/1 N |
| 2014/0077031 A1 | 3/2014 | Benedetti et al. |
| 2015/0041059 A1 | 2/2015 | Olson et al. |

OTHER PUBLICATIONS

Black, "Nacelle manufacturers optimize hand layup and consider closed molding methods," CompositesWorld (May 1, 2004). (Year: 2004).*

* cited by examiner

PANEL AND INSERT FOR CORNER RADII

This application claims priority to U.S. Patent Appln. No. 62/243,493 filed Oct. 19, 2015, which is herein incorporated by reference.

BACKGROUND

Figure 1:
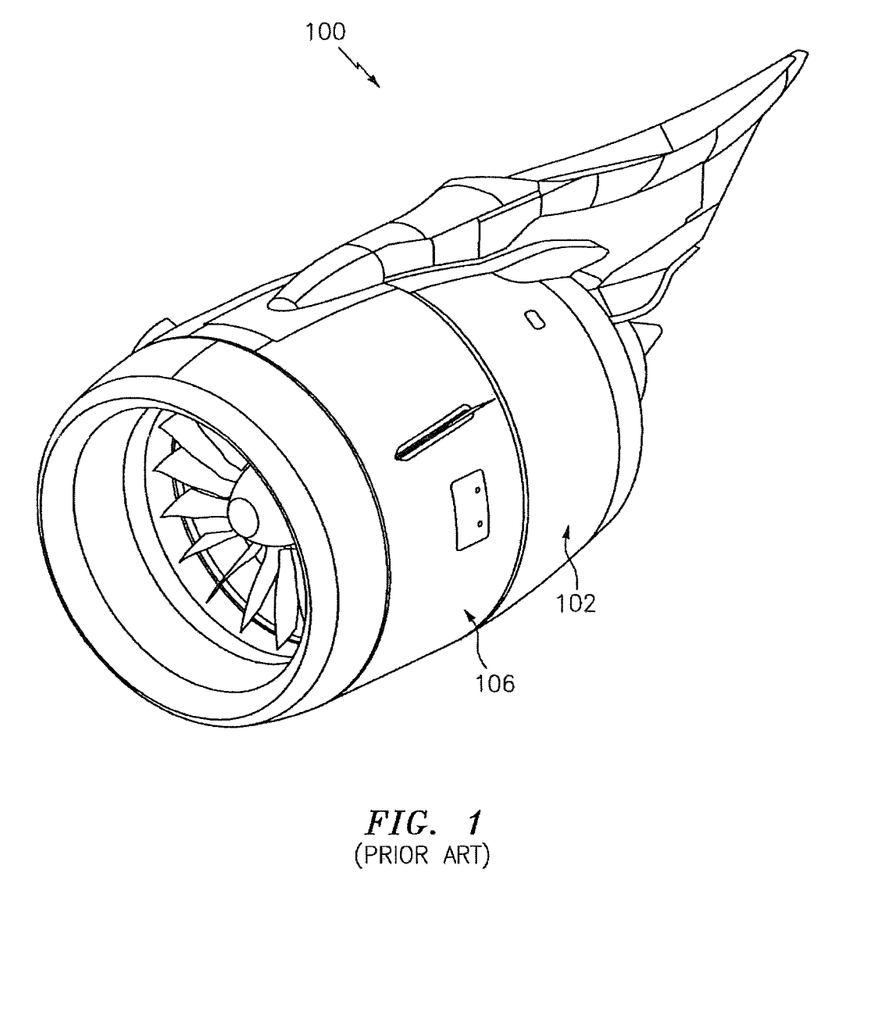
FIG. 1 illustrates components associated with an aircraft nacelle in accordance with the prior art.

Referring to FIG. 1, a nacelle 100 of an aircraft may be used to house an engine. The nacelle 100 may be composed of multiple components, such as for example a thrust reverser 102 and a fan cowl 106.

Figure 3:
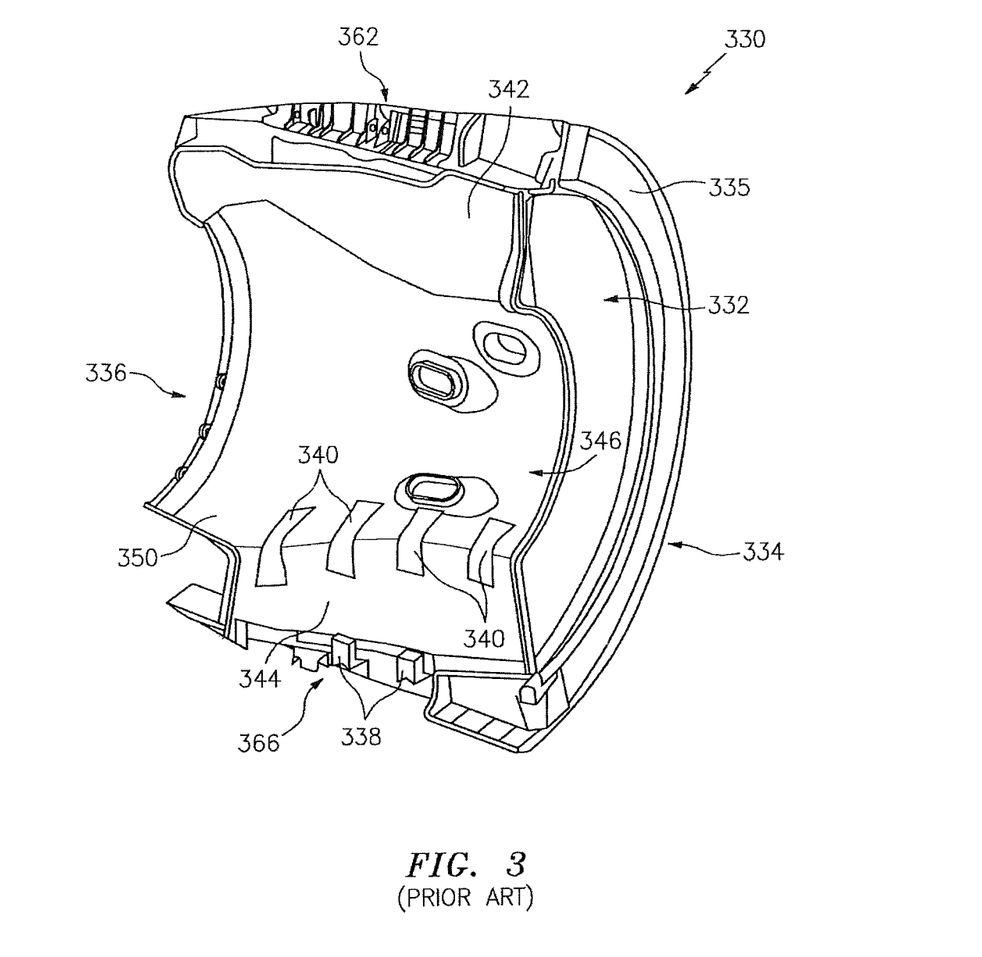
FIG. 3 illustrates a thrust reverser half which exposes a one half section of an inner fixed structure (IFS) foamed in two "clam-shell" halves in accordance with the prior art.

As shown in FIG. 1, the profile of the nacelle 100 may include complex shapes or contours, based on one or more requirements. In this respect, U.S. patent application publication number 2015/0041059 (hereinafter the '059 publication) describes techniques for arranging a corner fitting between, and attaching the corner fitting to, an inner barrel and a bifurcation panel. For example, and referring to FIG. 3 (substantially reproduced from the '059 publication), a thrust reverser half 330 is shown which exposes a one half section 332 of an inner fixed structure (IFS) formed in two "clam-shell" halves, only one clam-shell half being shown. The IFS section 332 has a forward end 334 and an aft end 336. The IFS is composed of an exterior stiffening member 335, an upper stiffening member 362, an inner IFS wall 350 that encases the engine, and a lower stiffening structure 366. The inner IFS wall 350 is composed of an upper bifurcation wall portion 342, a lower bifurcation wall portion 344 and inner acoustic barrel portion 346 formed between the two wall portions 342, 344. The IFS halves 332 are connected together by latches 338 at the bottom and hinged to a pylon at the top. Bumpers 340 provide a structural bridge between the gaps that separate the two IFS halves 332. The structural bridge provides a hoop load path to resist the crushing pressure of a fan air stream upon the barrel sections and bifurcations.

As made clear by the '059 publication, it can be difficult to manufacture a nacelle to accommodate the various shapes/geometries, such as for example corners/transitions that are associated with the nacelle (or a component thereof). Additionally, loads need to be controlled/distributed. All other things being equal, the greater the load within a given envelope, the greater the weight of the components that need to be used. The use of heavier components increases the weight of the aircraft, thereby decreasing the efficiency (e.g., fuel efficiency) of the aircraft.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a panel configured for use on an aircraft nacelle, comprising: a first skin, a second skin, a first core portion coupled to the first skin and the second skin, a second core portion coupled to the first skin and the second skin, and an insert coupled to the first skin, the second skin, the first core portion, and the second core portion, the insert forming a corner fitting between the first core portion and the second core portion. In some embodiments, the first skin and the second skin are made of a composite material. In some embodiments, at least one of the first skin or the second skin is continuous. In some embodiments, both the first skin and the second skin are continuous. In some embodiments, the insert is coupled to at least one of the first core portion or the second core portion via an adhesive. In some embodiments, the first core portion, the insert, and the second core portion form a continuous load path. In some embodiments, the insert is a monolithic structure. In some embodiments, the insert is made of at least one of metal or plastic. In some embodiments, the insert is arranged as at least one of a solid structure, a ribbed structure, a grid structure, or a honeycomb structure. In some embodiments, the first skin is located radially inboard of the second skin relative to an axis, and a radius measured from the axis to the first skin is approximately equal to 0.5 inches. In some embodiments, the panel is configured to be used as part of a transition associated with a barrel portion formed between two bifurcations.

Aspects of the disclosure are directed to a method of manufacturing a panel for use on an aircraft nacelle, comprising: manufacturing a first skin, coupling a first core portion and a second core portion to the first skin, coupling an insert to the first skin, the first core portion, and the second core portion, and coupling a second skin to the first core portion, the second core portion, and the insert, where the insert forms a corner fitting between the first core portion and the second core portion. In some embodiments, the method further comprises subjecting the first skin, the first core portion, the second core portion, the insert, and the second skin to a curing procedure. In some embodiments, the curing procedure includes an application of at least one of a heat source or a pressure source. In some embodiments, the method further comprises manufacturing at least one of the first skin or the second skin using a lay-up technique. In some embodiments, the method further comprises manufacturing at least one of the first skin or the second skin to be continuous. In some embodiments, the method further comprises applying an adhesive to the insert to couple the insert to at least the first core portion and the second core portion. In some embodiments, the method further comprises manufacturing the insert to have a corrugated profile at an interface between the insert and the first core portion. In some embodiments, the method further comprises forming the insert via at least one of: injection molding, compression molding, machining, 3D printing, casting, or extrusion. In some embodiments, the method further comprises applying an acoustic treatment to at least of the first skin or the second skin in proximity to the insert.

BRIEF DESCRIPTION OF THE DRAWINGS

The present disclosure is illustrated by way of example and not limited in the accompanying figures in which like reference numerals indicate similar elements.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for forming a sandwich panel. The panel may include one or more of a core/core portions, an insert, and skins. The insert may be substantially located at/near a corner relative to the core/core portions and may form a corner fitting. The insert may serve a structural purpose with respect to the panel in terms of, e.g., the manufacturability of the sandwich panel. The insert may serve a functional purpose with respect to the panel in terms of, e.g., the acoustic properties of the panel.

Figure 2:
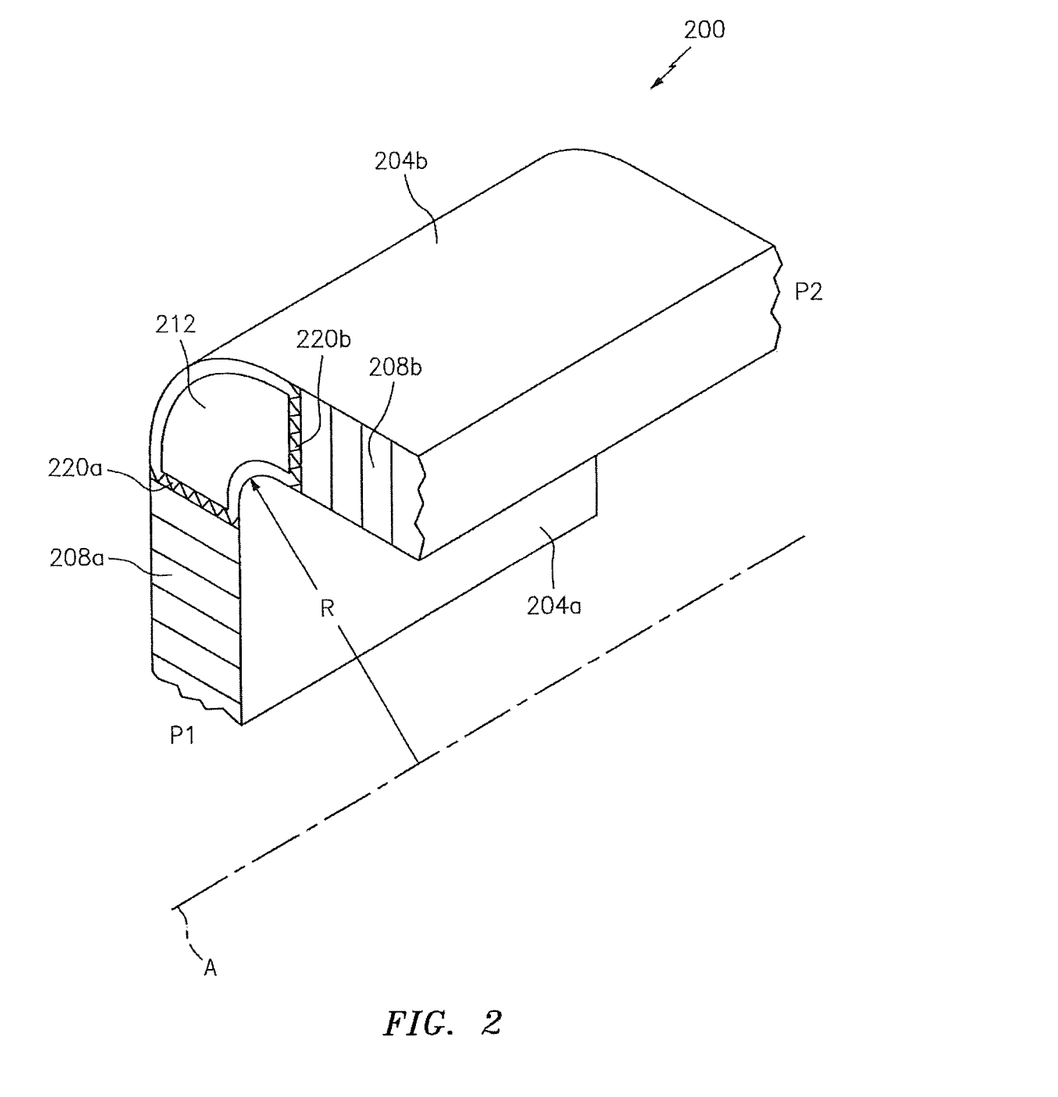
FIG. 2 illustrates a sandwich panel in accordance with aspects of this disclosure.

Referring now to FIG. 2, a sandwich panel 200 is shown. In some embodiments, the panel 200 may be used to accommodate a corner/transition between two or more components. For example, in connection with an illustrative use-case the panel 200 may be used as part of a transition associated with a barrel portion (e.g., barrel portion 346 of FIG. 3) formed between two bifurcations/wall portions (e.g., wall portions 342 and 344 of FIG. 3). The panel 200 may be used in other contexts, such as for example in connection with other portions of a nacelle.

The panel 200 may include one or more components, such as for example a first skin 204a, a first portion of a core 208a, a second portion of a core 208b, an insert 212, and a second skin 204b. One or more materials may be used in the construction of the panel 200; some illustrative examples are described below.

The skins 204a and 204b may be made of metal, composite, or other materials.

In some embodiments, the core portions 208a and 208b may be composed of one or more pieces of: metal (e.g., sheet metal), composite, plastic, paper, etc. The materials of the core portions 208a and 208b may be formed/arranged to adhere to a honeycomb structure.

The insert 212 may be manufactured to be a single, monolithic structure. The insert 212 may include plastic or metallic materials. The insert 212 may be formed via injection molding, compression molding, machining, 3D printing, casting, extrusion, or other techniques. The insert 212 may include one or more types of geometries. For example, the insert 212 may be arranged as a solid structure, a ribbed structure, a grid structure, a honeycomb structure, etc.

In some embodiments, acoustic properties may be taken into consideration in forming one or more portions/components of the panel 200. For example, one or both of the skins 204a and 204b may be manufactured to include an acoustic treatment in the proximity of the insert 212, such that the combination of the insert 212 and the skins 204a and 204b may share similar acoustic properties (in an amount that is within a threshold) in relation to the combination of the skins 204a and 204b and the core portions 208a and 208b. In this respect, the use of the insert 212 might not appreciably change the acoustic performance or noise output relative to conventional panels.

For reference purposes, superimposed in FIG. 2 is an axis 'A', which in some embodiments may correspond to a centerline of a nacelle or associated engine. In this respect, the second skin 204b may be located radially outboard from the first skin 204a, with the core portions 208a and 208b and the insert 212 located between the skins 204a and 204b. Furthermore, the skins 204a and 204b may be continuous in traversing the structure of the panel 200 from point P1 to point P2 as shown, which is to say that there might not be any discontinuities or breaks in the skins 204a and 204b. The use of continuous skins 204a and 204b may provide a continuous load path, thereby avoiding discontinuities (and hence concentrations of load) at the interfaces (e.g., bond joints) associated with such discontinuities.

The first portion of the core 208a may be coupled to the insert 212 at a first location 220a. The second portion of the core 208b may be coupled to the insert 212 at a second location 220b. The coupling at locations 220a and 220b may be facilitated using one or more techniques, such as for example bonding, application of one or more adhesives, etc.

In some embodiments, the interfaces between the insert 212 and the core portions 208a and 208b at the locations 220a and 220b may adhere to one or more shapes/profiles. For example, the insert 212 may include a corrugated shape/profile in order to increase the surface area at such interfaces.

A continuous load path may be formed between the core portions 208a and 208b and the insert 212 at, e.g., the locations 220a and 220b. In this respect, load in the core portions 208a and 208b or the insert 212 may be transferred more efficiently in shear and not be transferred to the skins 204a and 204b, or merely a portion of that load may end up being transferred to the skins 204a and 204b and therefore result in lighter skins 204a and 204b.

As described above, the shape/profile associated with a nacelle may include complex corners/transitions. For example, superimposed in FIG. 2 is a radius 'R' (illustratively shown as being measured relative to the axis 'A' and the first skin 204a). Based on a given design/requirement for a nacelle, the radius 'R' may be relatively small/tight, in some instances approximately being equal to, or less than, 1.5 inches (approximately 3.8 centimeters). In some embodiments, a decrease in a fillet from 2 inches (approximately 5.1 centimeters) to 0.5 inches (approximately 1.3 centimeters) may be realized on a 1 inch thick (approximately 2.5 centimeters) bond panel. Aspects of the panel 200 (e.g., the inclusion of the insert 212) may be used to accommodate such a small/tight radius 'R'. A smaller radius 'R' would extend the amount of core portions 208a and 208b, which correlates with an increase in the amount of area that can be acoustically treated on skin 204a or 204b.

Figure 4:
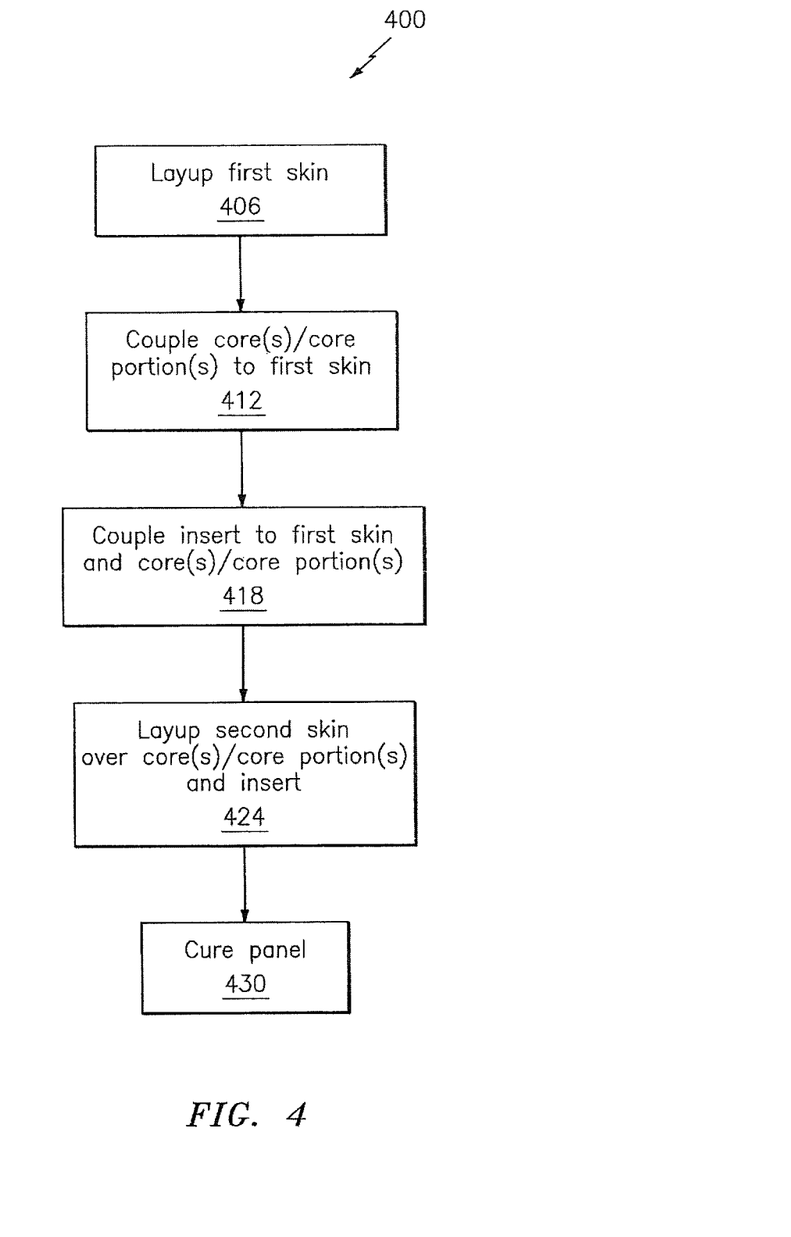
FIG. 4 illustrates a flow chart of an exemplary method for forming a sandwich panel in accordance with aspects of this disclosure.

Referring now to FIG. 4, a flow chart of an exemplary method 400 is shown. The method 400 may be used to form a panel, such as for example the panel 200 of FIG. 2.

In block 406, a first skin (e.g., skin 204a) may be laid-up. For example, the first skin may be manufactured using a lay-up technique, wherein layers of fabric/plies (e.g., prepreg plies) may be placed onto a tool set to form a laminate stack. Resin may be applied, potentially via resin infusion, to the plies. Dry or wet lay-up techniques may be used as part of block 406.

In block 412, one or more cores/core portions (e.g., core portions 208a and 208b) may be coupled to the first skin of block 406.

In block 418, an insert (e.g., insert 212) may be coupled to the first skin and the cores/core portions. As part of block 418, one or more adhesives may be applied between the insert and the cores/core portions.

In block 424, a second skin (e.g., skin 204b) may be coupled to the cores/core portions and the insert. The second skin may be manufactured using a lay-up technique similar to that described above in connection with the first skin of block 406.

In block 430, the panel that is constructed via blocks 406-424 (e.g., the skins, the core(s)/core portion(s), the insert, and any adhesives that may be used) may be subject to a curing procedure. The curing procedure may be facilitated by, or include, an application of a source of heat (e.g., the use of an oven) or a source of pressure (e.g., a vacuum). In some embodiments, the curing procedure may be facilitated via the use of an autoclave. The curing procedure may be based on the use of electron-beam (E-beam) curing.

The blocks of the method 400 described above are illustrative. In some embodiments, the blocks may execute in an order or sequence that is different from what is shown. In some embodiments, one or more of the blocks (or one or more portions thereof) may be optional. In some embodiments, additional blocks not shown may be included.

Technical effects and benefits of this disclosure include the provisioning of a panel that includes an insert. The panel may accommodate a small/tight radius associated with a corner/transition in a structure of, e.g., a nacelle or component(s) thereof. The panel may be used to control/distribute loads in a continuous manner/fashion. Still further, the loads may be distributed/controlled to facilitate a reduction/minimization in terms of packaging of a panel. This reduction in packaging may be used to increase/maximize fuel efficiency and to increase the acoustic performance.

To provide additional acoustic area in a nacelle, the insert 212 can be configured to accommodate acoustic attenuation while maintaining structural capability through tailored load paths. In conventional highly loaded bond panel corners, a high density core is used for structural purposes. Such a high density core, however, does not function as an acoustic attenuator. A high density core may also increase a radii as an inherit stiffness of the core does not allow the core to bend tight and complexly curved segments. By contrast, the core of the insert 212 can be configured with a complex curvature and be disposed into a bond panel assembly without, for example, extra contouring work.

Figure 5:
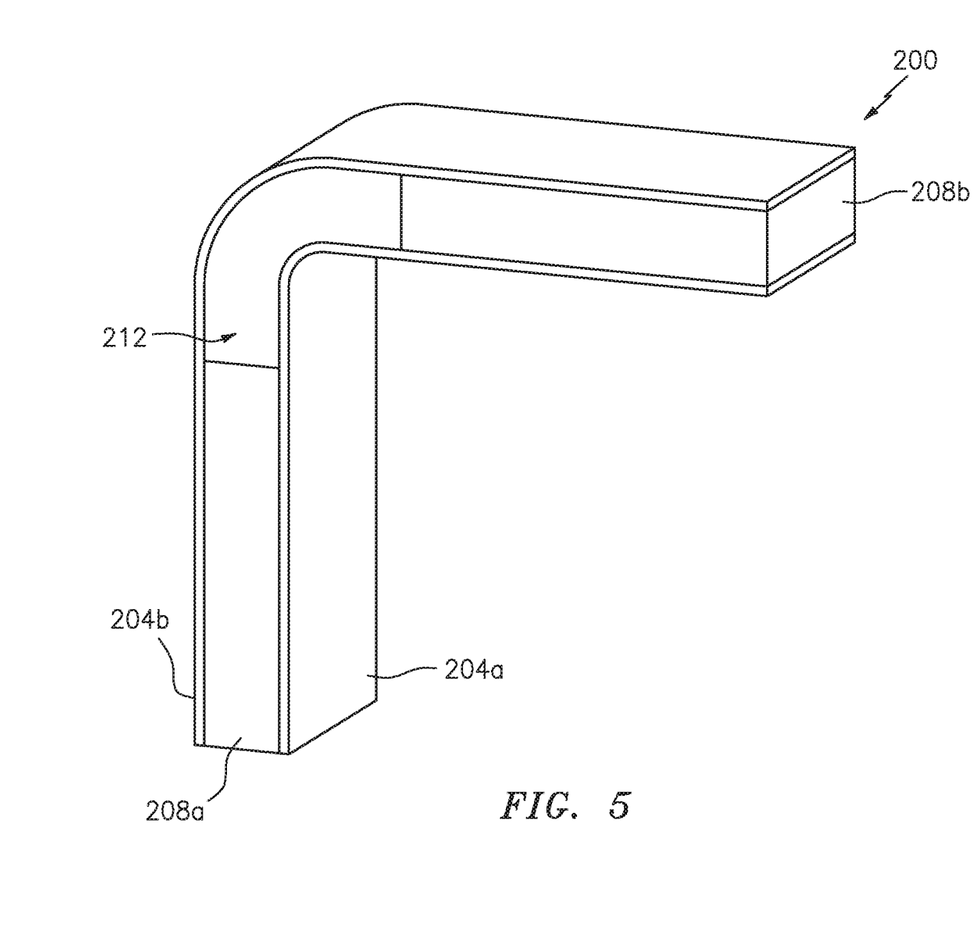
FIGS. 5-8 are perspective illustrations of portions of alternate embodiment sandwich panels.
Figure 6:
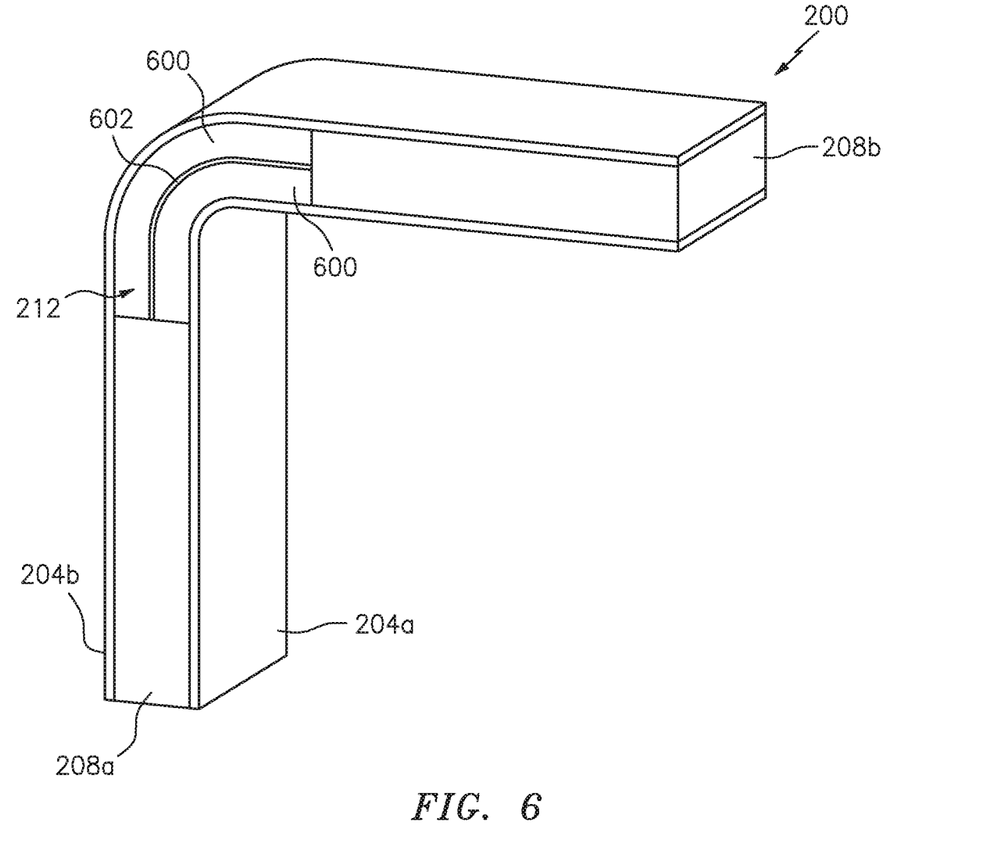
Figures 7, 8:
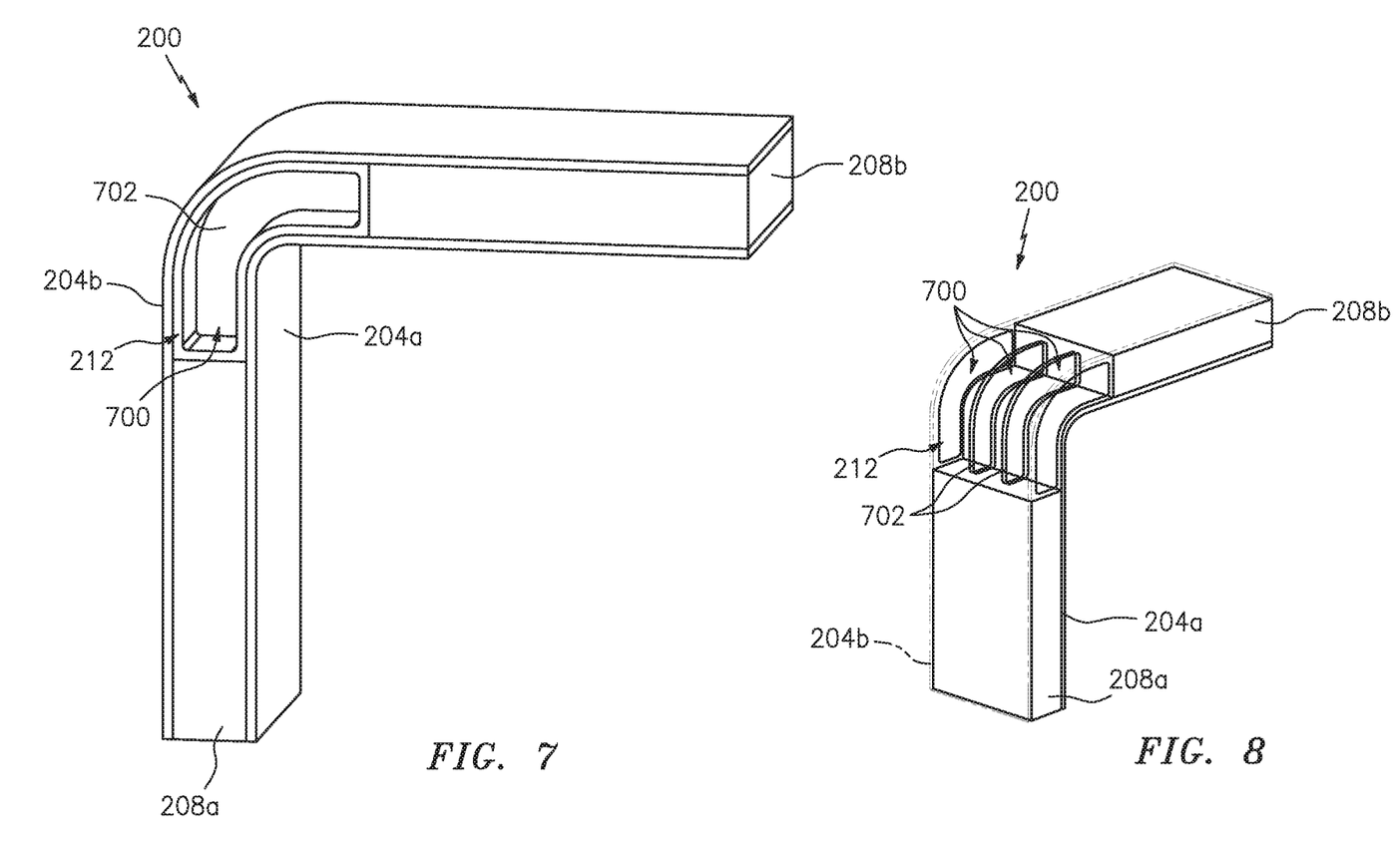

The insert 212 may have various configurations. For example, referring to FIG. 5, the insert 212 may have a substantially unitary and/or solid body. In another example, referring to FIG. 6, the insert 212 may include at least two members (e.g., pieces) of flexible core 600 bonded by a composite septum 602. The septum 602 may be configured to share shear loads and/or flat wise tension/compression loads with the outer skins 204a and/or 204b, which may reduce core load transfer. In still another example, referring to FIGS. 7 and 8, the insert 212 may be machined, additively manufactured (e.g., 3D printed), injection molded and/or otherwise formed with a complex (e.g., hollow and/or ribbed) body with one or more cavities 700 and/or one or more ribs 702 or other projections. Of course, the insert 212 of the present disclosure is not limited to the foregoing exemplary embodiments.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A panel for an aircraft nacelle, comprising:
   a first skin;
   a second skin;
   a first core portion coupled to the first skin and the second skin;
   a second core portion coupled to the first skin and the second skin; and
   an insert coupled to the first skin, the second skin, the first core portion and the second core portion, the insert forming a corner fitting between the first core portion and the second core portion;
   the insert comprising a first core structure and a second core structure bonded to and overlapping the first core structure, wherein the first core structure is adjacent the first skin, and wherein the second core structure is adjacent the second skin.

2. The panel of claim 1, wherein the first core structure comprises a flexible core.

3. The panel of claim 1, wherein
   the insert further comprises a composite septum; and
   the second core structure is bonded to the first core structure by the composite septum.

4. The panel of claim 1, wherein
   the first core structure extends from a first edge of the first core portion to a second edge of the second core portion; and
   the second core structure extends from the first edge of the first core portion to the second edge of the second core portion.

5. The panel of claim 1, wherein at least one of the first skin or the second skin comprises composite material.

6. The panel of claim 1, wherein at least one of the first skin or the second skin is continuous.

7. A panel for an aircraft nacelle, comprising:
   a first skin;
   a second skin;
   a first core portion coupled to the first skin and the second skin;
   a second core portion coupled to the first skin and the second skin; and
   an insert coupled to the first skin, the second skin, the first core portion and the second core portion, the insert forming a corner fitting between the first core portion and the second core portion, and the insert comprising a first endwall, a second endwall and a plurality of ribs;
   the first endwall abutted against the first core portion;
   the second endwall abutted against the second core portion; and
   each of the plurality of ribs extending longitudinally between and connected to the first endwall and the second endwall.

8. The panel of claim 7, wherein a cavity is formed between each adjacent pair of the plurality of ribs, and the cavity extends longitudinally from the first endwall to the second endwall.

* * * * *